United States Patent [19]

Vedamuthu

[11] 4,191,782
[45] Mar. 4, 1980

[54] METHOD FOR DIACETYL FLAVOR AND AROMA DEVELOPMENT IN CREAMED COTTAGE CHEESE

[75] Inventor: Ebenezer R. Vedamuthu, Bradenton, Fla.

[73] Assignee: Microlife Technics, Inc., Sarasota, Fla.

[21] Appl. No.: 833,082

[22] Filed: Sep. 14, 1977

Related U.S. Application Data

[63] Continuation-in-part of Ser. No. 639,052, Dec. 9, 1975, abandoned, and Ser. No. 712,692, Aug. 9, 1976.

[51] Int. Cl.$^2$ ............................................. A23C 19/02
[52] U.S. Cl. ....................................... 426/38; 426/43; 426/61; 435/885
[58] Field of Search ...................... 426/34, 36, 42, 38, 426/43, 61; 195/96

[56] References Cited

U.S. PATENT DOCUMENTS

| | | | |
|---|---|---|---|
| 3,323,921 | 6/1967 | Moseley et al. | 426/36 X |
| 3,592,740 | 7/1971 | Christensen | 195/96 |
| 3,852,158 | 12/1974 | Anderson et al. | 426/36 X |
| 3,911,140 | 10/1975 | Osborne et al. | 426/43 X |
| 3,968,256 | 7/1976 | Sing | 426/36 X |
| 3,975,545 | 8/1976 | Vedamuthu | 426/42 X |

OTHER PUBLICATIONS

Peebles et al., Preparation of Concentrated Lactic Streptococcus Starters, Applied Microbiology, vol. 17, No. 6, 1969 (pp. 805–810).

Douglas, J., A Critical Review of the Use of Glycerophosphates in Microbiological Media, Laboratory Practice, vol. 20, 1971 (pp. 414–416 & 424).

*Primary Examiner*—David M. Naff
*Attorney, Agent, or Firm*—Ian C. McLeod

[57] ABSTRACT

A biologically concentrated *Streptococcus diacetylactis* is used to develop in creamed cottage cheese a desirable diacetyl flavor and aroma when creamed cottage cheese is stored at refrigeration temperatures. The biologically concentrated *Streptococcus diacetylactis* is prepared without mechanical concentration by growing *Streptococcus diacetylactis* on a special media to produce at least about $10^9$ cells per ml.

10 Claims, No Drawings

METHOD FOR DIACETYL FLAVOR AND AROMA DEVELOPMENT IN CREAMED COTTAGE CHEESE

CROSS-REFERENCE TO RELATED APPLICATIONS

This application is a continuation-in-part of my application Ser. No. 639,052, filed Dec. 9, 1975, now abandoned and my application Ser. No. 712,692, filed Aug. 9, 1976, now allowed.

SUMMARY OF THE INVENTION

The present invention generally relates to the preparation of creamed Cottage cheese with a desirable diacetyl flavor and aroma using "biologically" concentrated *Streptococcus lactis* subspecies *diacetylactis* concentrates, which are not mechanically concentrated, without an elevated temperature (above refrigeration temperatures) incubation of the creaming mixture. In particular, the present invention relates to the use of specially grown *Streptococcus diacetylactis* "fermentation tank" or "biological" concentrates which are not mechanically concentrated and which are added directly to the cooled creaming mixture alone and then the mixture is added to the cooled Cottage cheese curd at refrigeration temperatures.

PRIOR ART

Early methods involving the use of selected bacteria in Cottage cheese creaming mixtures to develop diacetyl flavor and aroma are described in Babel et al (U.S. Pat. No. 2,971,847) and in Moseley et al (U.S. Pat. No. 3,323,921) and have been used to some extent commercially. In these methods, milk is fermented with selected flavor producing bacteria at elevated temperatures (21° C. to 25° C.), which are considerably above normal refrigeration temperatures, for a period of time and then the fermented milk, sometimes blended with additional sweet cream, is mixed with the Cottage cheese curd. Multiple steps are required in preparing the Cottage cheese by these methods and off-flavors can easily be introduced by the elevated temperature fermentation.

In Sing (U.S. Pat. No. 3,968,256), Lundstedt (U.S. Pat. No. 3,048,490) and my application Ser. No. 639,052, filed Dec. 9, 1975, low or refrigeration temperature flavor and aroma development in creamed Cottage cheese is described. The Lundstedt method uses citrated whey, which does not contain non-fat milk solids or casein since they are precipitated from the whey. The applicant believes milk and/or casein are very important to obtain cells with optimum physiological characteristics for low temperature diacetyl flavor and aroma development in creamed Cottage cheese. Citrated skim milk does not produce diacetyl aroma in Cottage cheese as described by Lundstedt in Dairy Science Vol. XLV, No. 11, pages 1320 to 1331 (Nov. 1962). Lundstedt does describe the use of fermentation tank grown bacteria added without further concentration directly to Cottage cheese for low temperature flavor development. It is not believed that the Lundstedt method is used commercially probably because sufficient numbers of cells were not present in the tank medium which would allow its addition at a rate that would; (a) be compatible with normal processing facilities and (b) not contribute to significant alteration of the composition of the dressed cheese.

Sing describes the use of whole milk as a growth medium in the manner of Moseley et al. In my application Ser. No. 639,052, I describe the use of a low non-fat milk solids containing media which is an improvement over the medium of Sing. In both Sing and my prior application Ser. No. 639,052, the methods specifically disclosed involve an additional step of mechanical concentration of the *Streptococcus diacetylactis* from the fermentation tank, particularly by centrifugation, to remove a portion of the by-products from the growth of the bacteria. It would reduce the costs of the low temperature method for preparing Cottage cheese if the bacteria could be added to the creamed Cottage cheese directly after growth as a biological concentrate, without any mechanical concentration steps; however, there are usually insufficient numbers of bacteria in the usual growth medium to make this a practical alternative. There is also the problem suggested by Lundstedt. The Cottage cheese must usually contain $10^5$ to $10^8$ *Streptococcus diacetylactis* per gram for the desired flavor development which would require a substantial amount of a conventionally grown fermentation tank culture.

The prior art has described growth media including citrates and/or phosphates, a nitrogen source including yeast materials, and non-fat milk and/or milk casein digests for bacterial growth. Illustrative are U.S. Pat. Nos. 3,852,148; 3,592,740 and Re. 28,488 and there are many growth media described in the prior art. It has not been recognized by the prior art that particular compositions employing these ingredients could be used to grow bacterial cultures which could be used without concentration for the low temperature preparation of creamed Cottage cheese.

OBJECTS

It is therefore an object of the present invention to provide a method of preparing creamed Cottage cheese using a specially grown "fermentation tank" or "biological concentrate" of *Streptococcus diacetylactis* which is not mechanically concentrated to impart diacetyl flavor and aroma at refrigeration temperatures and without incubating the creaming mixture at elevated temperatures prior to addition of the bacteria to the Cottage cheese curd. It is further an object to provide such concentrates which can be stored for substantial periods and shipped in frozen form with only a small loss of viability. These and other objects will become increasingly apparent by reference to the following description.

GENERAL DESCRIPTION

The present invention relates to the method of providing improved diacetyl flavor and aroma in creamed Cottage cheese which comprises: providing a biologically concentrated *Streptococcus diacetylactis* which is not mechanically concentrated and which has been grown in an aqueous growth medium containing as solids dispersed or dissolved in water, non-fat milk or milk casein digest and mixtures thereof, a yeast material, a citrate and lactose all of which can be metabolized by the *Streptococcus diacetylactis*, the solids being present in amounts such that at least about $10^9$ (one billion) *Streptococcus diacetylactis* per ml are produced in the medium, wherein the concentrate is frozen for shipment and storage and then thawed for use; and providing the thawed biological concentrate in creamed Cottage cheese in an amount sufficient to develop a desirable diacetyl flavor and aroma upon storage at refrigeration temperatures. Optimally dextrose is used to provide rapid growth of the *Streptococcus diacetylactis*. Phosphates are also preferably used to increase the yields of *Streptococcus diacetylactis*. Usually the yields are above $10 \times 10^9$ (ten billion) bacteria per ml with the preferred growth media.

Thus *Streptococcus diacetylactis* are grown in an aqueous medium which supports the growth of the bacteria to a biological concentration of at least about $10^9$ cells per ml and which includes milk casein digest or non-fat milk, or mixtures thereof, yeast materials, preferably a digest, a citrate and lactose, all of which can be metabolized by the *Streptococcus diacetylactis* and the biological concentrate can be frozen for storage and shipment to the user alone or with a freezing stabilizing agent such as glycerol. Unexpectedly it has been found that there is no need for further or mechanical concentration of the bacteria (such as by centrifugal separation) and that they can be frozen and then thawed and used directly from the fermentation tank as a biological concentrate in creamed Cottage cheese for low temperature flavor and aroma development. The growth medium is highly fortified but has a total dispersed or dissolved solids content of less than twenty-five percent (25%) by weight.

The milk casein digest is used in an amount of at least about 0.01 to 0.2 part per part water. Non-fat milk is used in an amount of at least about 0.01 to 0.2 part per part of water. Citrate is a necessary ingredient for inducing the bacteria to generate flavor and aroma at low temperatures in the Cottage cheese and is preferably used in an amount between about 0.0005 and 0.005 part by weight per part of water in the medium. Lactose is preferably used in an amount between about 0.0025 and 0.025 part per part of water and is necessary for the growth of the bacteria. The yeast material is preferably a yeast extract in an amount between about 0.005 and 0.015 part per part of water and is necessary for the high yields. Dextrose is preferably used in an amount of between about 0.0025 and 0.025 part per part of water to speed up growth.

Milk casein digest is produced with enzymes which hydrolyze or degrade casein a high molecular weight protein into peptones, peptides and amino acids which are readily assimilated by the *Streptococcus diacetylactis* and is preferred. Yeast materials, including yeast extract (or soluble yeast), yeast hydrolysate, food yeast, yeast autolysate, serve the same function and contain amino acids and other essential growth factors which the bacteria can metabolize. Dextrose and lactose are sugars which are assimilated by *Streptococcus diacetylactis* and are naturally occurring in milk. Non-fat milks include skim milk and the various powdered dehydrated milks.

It has been found that the method of the present invention imparts a desirable diacetyl flavor and aroma to the creamed Cottage cheese because of the high numbers of viable and active *Streptococcus diacetylactis* in the specially grown biological concentrate, and the unique ability of these bacteria in the biological concentrate to synthesize diacetyl at normal refrigeration temperatures without concomitant excessive lactic acid production. Excessive lactic acid production induces a "sour" defect in Cottage cheese. *Streptococcus diacetylactis* grown in media which are low in one of the above essential materials, without an additional or mechanical concentration step, have insufficient numbers of bacteria and/or do not function well at low temperatures in Cottage cheese in developing flavor and aroma.

*Streptococcus diacetylactis*, also has the known ability to inhibit spoilage organisms in the Cottage cheese over a substantial storage period which is also used in the present invention. This general characteristic is discussed in a paper published in the Journal of Milk and Food Technology, Vol. 35, No. 6, pages 349–357 (June 1972) and in a publication entitled "Competitive Growth of Streptococcus Diacetilactis in Mixed Strain Lactic Cultures and Cheese" Band D des XVII, Internationalen Milchwirtschaftskongresses Section D 2, pages 611–618, (1966).

It is known that acetaldehyde is a by-product of *Streptococcus diacetylactis* fermentative action on the lactose-citrate systems present in milk. When acetaldehyde is accumulated in relatively large amounts, it causes a flavor defect, characterized as "green," in Cottage cheese and certain other fermented dairy products. The "green" flavor defect preferably is prevented or eliminated by utilizing concentrates of *Leuconostoc cremoris* or *Leuconostoc dextranicum* mixed with the previously described *Streptococcus diacetylactis* biological concentrates. *Leuconostoc cremoris* particularly possesses high (in relative terms) alcohol dehydrogenase activity which allows the organism to remove or scavenge any excess acetaldehyde generated by *Streptococcus diacetylactis* in the creaming mixture, thus preventing the "green" flavor defect.

The fortification of the creamed Cottage cheese, particularly the creaming mixture, with citrates, in addition to the citrate already present in the biological concentrates, allows for enhanced diacetyl production and thus improved flavor and aroma. The use of citrate in this manner for flavor aroma development in Cottage cheese is known in the prior art.

In creamed Cottage cheese, *Streptococcus diacetylactis* slowly grows at less than 50° F. (10° C.) and generates a low concentration of lactic acid; however, since the normal store shelf temperature must be between 40° to 45° F. (4.4° to 7.2° C.) for a shelf life of about 21 days or less, excessive acid accumulation is not a problem. Relatively little acid is generated in this time period at these temperatures. Thus flavor and aroma can be generated at normal refrigeration temperatures within 24 to 48 hours by using the biological concentrate of *Streptococcus diacetylactis* alone or a mixture of *Streptococcus diacetylactis* and Leuconostoc species.

SPECIFIC DESCRIPTION

Example 1 shows the preferred method for preparation of creamed Cottage cheese using *Streptococcus diacetylactis* 18-16 WT biological concentrates as well as using a preferred mutant strain of *Streptococcus diacetylactis* NRRL-B-8177 described in my application Ser. No. 712,692, filed Aug. 9, 1976. Example 2 shows 18-16 WT prepared in various non-fat milk or milk casein digest media to at least about $10^9$ cells per ml.

EXAMPLE I

The growth medium was by weight solids dissolved in water as follows:

| | |
|---|---|
| NZ-AMINE $B_{t.m.}$ (casein pancreatic enzyme digest, Humko Sheffield Chemical, Memphis, Tennessee) | 2.0% |
| Yeast extract (Paste) | 1.5% (adjusted to solids content of |

-continued

| | paste) |
|---|---|
| Dextrose | 2.5% |
| Lactose | 2.5% |
| Sodium Citrate | 0.2% |

The growth medium is like a highly fortified non-fat milk with a low solids content except that the casein is digested to make it more readily assimilable by the bacteria. The growth medium was sterilized at 121° C. for 30 minutes and cooled to room temperature. The pH of the medium was adjusted to 6.8 and then it was inoculated with the *Streptococcus diacetylactis* 18-16 WT or NRRL-B-8177 in a fermentation tank which had an inlet to automatically introduce gaseous ammonia as required to maintain the pH of the medium at about 6.4 during growth. The pH of the product is between about 6.0 and 7.0. The fermentation was conducted for 24 hours at room temperature. A temperature of 30° C. was also found to be suitable for a faster 18 hr fermentation. The results are shown in Table I.

TABLE I

| | Visual Counting at a Dilution of | CFU* 1 | CFU 2 | CFU Average of 1 and 2 | Final Fermentation Tank or Biological Concentrate Count/ml |
|---|---|---|---|---|---|
| 18-16 | $10^{-8}$ | 114 | 150 | 132 | $13.2 \times 10^9$ |
| B-8177 | $10^{-8}$ | 66 | 63 | 64 | $6.4 \times 10^9$ |
| After freezing the tank broth and thawing: | | | | | |
| 18-16 | $10^{-8}$ | 119 | 111 | 115 | $11.5 \times 10^9$ |
| B-8177 | $10^{-8}$ | 40 | 41 | 41 | $4.1 \times 10^9$ |

*Colony Forming Units

The casein digest growth medium gave very high bacteria counts particularly with 18-16 WT, which grows better than B-8177 and the biological concentrate is stable to freezing even without added glycerol which is a known freezing stabilizing agent. After ten (10) weeks of storage, the frozen biological concentrate of 18-16 WT contained between about 7.0 and $7.9 \times 10^9$ viable bacteria per ml without glycerol.

The biological concentrate of 18-16 WT was used directly for a low temperature cream dressing for Cottage cheese. A pasteurized creaming mixture of 4 parts skim milk and 6 parts of a 20% by weight butterfat cream was cooled to a temperature of 40° F. (4.4° C.). The biological concentrate, containing 7.0 to $7.2 \times 10^9$ viable bacteria per ml after thawing from freezing without a stabilizing agent, was blended into the creaming mixture at a rate of 170 grams of concentrate per 200 gallons (0.757 cubic meters) of creaming mixture for a period of 30 minutes without allowing the temperature to rise above 50° F. (10° C.). The inoculated creaming mixture was directly applied to drained Cottage cheese curd, cooled to the same temperature so as to provide about $5.3 \times 10^5$ bacteria per gm of dressed Cottage cheese and then the creamed Cottage cheese was packaged. The cartons were stored at 40° F. (4.4° C.) or below. Noticeable flavor and aroma developed (diacetyl) between 24 and 48 hours at the storage temperature.

Cottage cheese storage tests were conducted (a) with a control containing an uninoculated cream dressing; (b) with the biologically concentrated 18-16 WT inoculated into the cream dressing so as to provide about $1 \times 10^5$ to $9.9 \times 10^5$ bacteria per gm of Cottage cheese; (c) with a control of *Pseudomonas aeruginosa* at $10^3$ bacteria per gm of Cottage cheese; and (d) with *Pseudomonoas aeruginosa* at $10^3$ bacteria per gm and with biologically concentrated 18-16 WT at $1 \times 10^5$ to $9.9 \times 10^5$ bacteria per gm of Cottage cheese. The biological concentrate was frozen for storage and thawed for use. Sixteen (16) cartons of Cottage cheese (four (4) of each) made according to the foregoing protocol were stored at 40° F. (4.4° C.) for weekly organoleptic and/or visual evaluations. The results are shown in Table II. The *Pseudomonas aeruginosa* contaminated samples were not tasted for health reasons.

TABLE II

| (1) Observations on Cottage cheese at one (1) week | | | |
|---|---|---|---|
| Details on Samples | Visual | Odor | Taste |
| (a) Control-No Inoculum | Normal | None | Flat, Salty |
| (b) With biologically concentrated (b.c.) 18-16 WT alone | Normal | None | Flat |
| (c) With *P. aeruginosa* (P. A.) alone | Normal | None | Not tasted |
| (d) With b.c. 18-16 WT and P.A. | Normal | None | Not tasted |
| (2) Observations on Cottage cheese at two (2) weeks | | | |
| Details on Samples | Visual | Odor* | Taste |
| (a) Control-No Inoculum | Normal | None | Flat, slighty bitter |
| (b) With b.c. 18-16 WT alone | Normal | Good $Ac^2$ | Good $Ac^2$ flavor |
| (c) With P.A. alone | Normal | No odor/ slightly fruity | Not tasted |
| (d) With b.c. 18-16 WT and P.A. | Normal | $Ac^2$ | Not tasted |
| (3) Observations on Cottage cheese at five (5) weeks | | | |
| Details on Samples | | | |
| (a) Control-No Inoculum | No flavor (flat, bitter after taste) | | |
| (b) With b.c. 18-16 WT alone | No flavor (flat, bitter after taste) | | |
| (c) With P.A. alone | No off-odors and no diacetyl odor. Visible discoloration due to contaminant growth on the surface. Brownish-yellow, slimy growth. | | |
| (d) With b.c. 18-16 WT and P.A. | Visibly all right with no off-odors and diacetyl odor | | |

*$Ac^2$ as a diacetyl odor

All samples showed spoilage after six (6) weeks and two days with an off-odor and a yellow discoloration. The samples were discarded at this stage since it was well past the normal storage period.

The conclusion was that the addition of the biological concentrate of 18-16 WT prevented the spoilage of samples containing a bacterial contaminant (P.A.) over a period of about four (4) weeks. Also the biological concentrate provided good diacetyl flavor and aroma for at least up to two (2) weeks. Equivalent results were obtained with the mutant NRRL-B-8177.

EXAMPLE 2

In this Example, a low milk containing medium, referred to as LTM or Liquid Tank Medium, was evaluated with various additional ingredients and with some removed. The LTM medium was formulated as follows where the ingredients were by weight:

Non-fat milk—1%
Yeast extract—1.5%
Lactose—2.0%
$Na_2HPO_4$—0.35%
$KH_2PO_4$—0.53%

The media evaluated were as follows:
(1) Lactic Tank Medium (LTM) plus 0.2% by weight sodium citrate.

(2) Lactic Tank Medium (LTM) without phosphates but with 0.2% by weight sodium citrate.
(3) Example 1 medium plus the phosphates as in LTM.
(4) Example 1 medium plus beta sodium glycerophosphate.
(5) Lactic Tank Medium (LTM) with phosphates plus 0.2% by weight sodium citrate and with 2.5% by weight yeast extract.
(6) Lactic Tank Medium (LTM) as in (5) but no phosphates.

All runs were made at 25° C. for 17 hr. pH adjusted to 6.8. pH stat at 6.4. The results are shown in Table III.

TABLE III

| Medium | Dilution | 1 | 2 | Average | Final Count/ml |
|---|---|---|---|---|---|
| (1) LTM and 0.2% sodium citrate | $10^{-8}$ | 107 | 110 | 109 | $11.0 \times 10^9$ |
| (2) LTM with no phosphate and 0.2% sodium citrate | $10^{-8}$ | 51 | 51 | 51 | $5.1 \times 10^9$ |
| (3) Example 1 medium and phosphate | $10^{-8}$ | 122 | 108 | 120 | $12.0 \times 10^9$ |
| (4) Example 1 medium plus beta sodium glycerophosphate | | | | | |
| Run #1 | $10^{-8}$ | 144 | 146 | 145 | $14.5 \times 10^9$ |
| Run #2 | $10^{-8}$ | 149, 176 | 160, 144 | 157 | $16.0 \times 10^9$ |
| (5) LTM (2.5%) Yeast extract | $10^{-8}$ | 86 | 77 | 82 | $8.2 \times 10^9$ |
| (6) LTM (2.5% yeast extract) and no phosphate | $10^{-8}$ | 101 | 83 | 92 | $9.2 \times 10^9$ |

As can be seen from Table III, the fortified low-fat milk medium produces high final bacterial counts which however are not as good as with the milk casein digest of Example 1. The presence of assimilable phosphate greatly increases the yield as can be seen from the results with media (1), (3) and (4) compared to (2) and (6). The presence of citrate is necessary for inducing the citratase enzyme, which is important in the production of diacetyl from the precursor citric acid. Where a non-milk protein digest such as soy protein digest was used in the medium of Example 1, poor yields were obtained. The low fat milk and milk casein digest derived biological concentrates produce good Cottage cheese. All of the biological concentrates can be frozen as prepared or with a stabilizing agent.

As can be seen from Examples 1 and 2, the method of the present invention is unique because of the use of the biologically concentrated bacteria which are thus not mechanically concentrated and because of the absence of an elevated temperature fermentation (by incubation at 21° C. to 25° C.) of the creaming mixture. The finished creamed Cottage cheese is superior in flavor and aroma.

I claim:

1. The method of providing improved diacetyl flavor and aroma in creamed Cottage cheese by adding thereto a concentrate of *Streptococcus diacetylactis* which is not mechanically concentrated to develop the flavor at refrigeration temperatures, said method consisting essentially of:
    (a) providing an aqueous growth medium containing as solids dispersed or dissolved in water, non-fat milk or milk casein digest or mixtures thereof, a yeast material containing amino acid and other essential growth factors for *Streptococcus diacetylactis*, a citrate, and separately added lactose all of which can be metabolized by *Streptococcus diacetylactis* cells, the solids being present in an amount less than about 0.25 part per part of the aqueous medium;
    (b) inoculating and then growing *Streptococcus diacetylactis* cells in the growth medium at a temperature and for a time to increase the number of cells in the medium to above $10 \times 10^9$ cells per ml of medium while adjusting the pH between 6.0 and 7.0 to produce a cell concentrate containing above said $10 \times 10^9$ cells per ml and without further concentrating the number of cells in the medium, freezing the medium to obtain a frozen cell concentrate for storage and shipment;
    (c) thawing the frozen cell concentrate; and
    (d) mixing the thawed cell concentrate in creamed Cottage cheese in an amount to provide between about $10^5$ and $10^8$ *Streptococcus diacetylactis* cells per gram of Cottage cheese whereby there is developed a desirable diacetyl flavor and aroma upon storage of the creamed cottage cheese at refrigeration temperatures.

2. The method of claim 1 wherein the *Streptococcus diacetylactis* is strain 18-16 WT.

3. The method of claim 1 wherein the *Streptococcus diacetylactis* is strain NRRL-B-8177.

4. The method of claim 1 wherein the number of *Streptococcus diacetylactis* provided by the cell concentrate in the creamed cottage cheese is between $1 \times 10^5$ and $1 \times 10^6$ per gram of Cottage cheese.

5. The method of claim 1 wherein the growth medium additionally contains a phosphate and dextrose which are metabolizable, the growth medium contains milk casein digest and the combined amount of milk casein digest, dextrose and lactose in the growth medium is at least about 0.8 part per 10 parts of water by weight.

6. The method of claim 1 wherein the *Streptococcus diacetylactis* cells are grown in the aqueous growth medium for between about 14 and 24 hours at a temperature of between 21° and 30° C. while adjusting the pH to between 6.0 and 7.0 with gaseous ammonia.

7. The method of claim 1 wherein the growth medium additionally includes dextrose which is metabolizable, the growth medium contains milk casein digest and the growth medium contains at least about 0.01 part milk casein digest, about 0.015 part yeast extract as the yeast material, about 0.05 part lactose and dextrose taken together and about 0.0005 part citrate per part water by weight.

8. The method of claim 1 wherein the amount of citrate is between about 0.0005 and 0.005 part per part of water by weight.

9. The method of claim 1 wherein the aqueous growth medium additionally contains an assimilable phosphate.

10. The method of claim 9 wherein the phosphate is beta sodium glycerophosphate.